(12) United States Patent
Bent et al.

(10) Patent No.: US 9,934,147 B1
(45) Date of Patent: Apr. 3, 2018

(54) CONTENT-AWARE STORAGE TIERING TECHNIQUES WITHIN A JOB SCHEDULING SYSTEM

(71) Applicant: EMC Corporation, Hopkinton, MA (US)

(72) Inventors: John M. Bent, Los Alamos, NM (US);
Sorin Faibish, Newton, MA (US);
Dennis P. J. Ting, Groton, MA (US);
Percy Tzelnic, Concord, MA (US);
Uday Gupta, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/751,740

(22) Filed: Jun. 26, 2015

(51) Int. Cl.
 *G06F 12/08* (2016.01)
 *G06F 12/0831* (2016.01)
 *G06F 12/0862* (2016.01)

(52) U.S. Cl.
 CPC ...... *G06F 12/0833* (2013.01); *G06F 12/0862* (2013.01); *G06F 2212/602* (2013.01); *G06F 2212/62* (2013.01)

(58) Field of Classification Search
 CPC .... G06F 3/0604; G06F 9/4881; G06F 3/0631; G06F 3/0673
 See application file for complete search history.

(56) References Cited

U.S. PATENT DOCUMENTS

2013/0132967 A1* 5/2013 Soundararajan ...... G06F 9/5066
 718/104

OTHER PUBLICATIONS

Sabne et al., "HeteroDoop: A MapReduce Programming System for Accelerator Clusters", HPDC '15, Portland, Oregon (Jun. 2015).
"The PBS Job Scheduler" http://www.arc.ox.ac.uk/content/pbs, downloaded on Jun. 23, 2015.
"The Slurm Job Scheduler", http://www.arc.ox.ac.uk/content/slurm-job-scheduler, downloaded on Jun. 23, 2015.
Tannenbaum et al., "Condor—A Distributed Job Scheduler", MIT Press, pp. 307-350 (2001).
Sabne et al., HeteroDoop: Automatically Exploiting CPUs and GPUs for Big Data MapReduce, Purdue University.
"Guidelines on File Naming Conventions for Digital Collections", Digital Projects Advisory Group, University Libraries, pp. 1-4, Mar. 4, 2008.

* cited by examiner

*Primary Examiner* — Michael Alsip
(74) *Attorney, Agent, or Firm* — Ryan, Mason & Lewis, LLP (57) ABSTRACT

Techniques are provided for content-aware storage tiering techniques within a job scheduling system. A data node in a job scheduling environment receives at least one job to be executed for a portion of a larger logical file, and notifies one or more sibling data nodes to prefetch one or more related portions of the larger logical file. A write operation performed by an application client to store data on the data node is optionally intercepted at the data node and the associated data is stored in a performance storage tier of the data node. The data is optionally moved from the performance storage tier to a capacity storage tier if one or more predefined eviction criteria are satisfied. Data objects to be evicted are selected based on an anticipated future access of the data objects. The eviction selection is optionally based on grey box knowledge of the application client and/or information obtained from the application client.

21 Claims, 7 Drawing Sheets

```
/*
 * 310: interception code for reads
 */
read_2t(file, off, len) {
    bool in_fast = query_2t(file,off,len); // is it already in fast tier
    if (not in_fast) {
        // bring it into fast
        promote_2t(file,off,len);
        logical_name = Name_Node.query(file);
        // send message to other nodes that they might expect to also receive reads for this file,
        // with low confidence (based on a guess)
        foreach sibling data_node {
            sibling.predict(file,LOW_CONFIDENCE);
        }
    }
    ~~
    file.consumed = TRUE; // mark it as read to help the victim selection in free_space below
    ~~
}

/*
 * 320: Daemon predicts that something might be read
 * This code might go ahead and prefetch if it suspects a high probability of subsequent read.
 */
predict(file,confidence) {
    if (confidence == HIGH_CONFIDENCE) {
        file.weight = -2;
    } else {
        file.weight = 0;
    }
    ~~
}
```

```
┌─────────────────────────────────────────────────────────────────────┐ ⌐300
│ // 330: run the free_space algorigthm below but don't actually evict anything
│   // just use it to compute the weight of everything currently in the performance
│   // tier 140 then check whether there is anything currently cached with weight
│   // higher than file.weight as set above
│   // if there is, then evict it
│   if (fast.space < file.length) {
│     promote_2t(file,0,length); // if there is space, fetch it
│   }
│ }
│
│ /*
│  * 340: code to pull a copy of data from capacity tier 150 to performance tier 140
│  */
│ promote_2t(file,off,len) {
│   buffer = malloc(len);
│   if fast.space < len { // need to promote but no space
│     fast.free_space(len - fast.space)
│   }
│   capacity.read(file,off,len,buffer);
│   fast.write(file,off,len,buffer);
│ }
│
│ fast.write(file,off,len,buffer) {
│   // 350 check space again. Shouldn't be necessary to do it again here
│   // but do it just in case to avoid race conditions
│   while fast.space < len { // need to promote but no space
│     fast.free_space(len - fast.space)
│   }
│   space -= len; // reserve the space conceptually
│   fd = fd_cache(file); // simple fd cache implementation
│   fd.write(off,len,buffer);
│ }
└─────────────────────────────────────────────────────────────────────┘
```

FIG. 3C

```
                                                                    ┌─ 300
free_space(how_much) {
  // this loop shows the basic algorithm but the implementation
  // would do the same thing with caching of this information
  foreach block in storage {
    // each block can be either dirty or clean
    // each block can be either consumed or pending
    // pending means it has been written by not yet read
    // consumed means it has been read
    // HDFS does not often have much re-read so consumed
    // blocks are better to evict than pending blocks
    // dirty blocks are not good candidates since it is slow to evict them
    weight = 1 if clean else -1;
    weight = weight - 1 if pending;
    weight = weight + 1 if consumed;
   weight = weight + age; // older is better as well
    // create a weight for each
    // the most likely to be vacated are those which are read
  }
  // 360: go through and evict the heaviest ones until space is made
}

/*
 * 370: two-tier daemon 135 maintains metadata about which data is in which tier
 * this function returns true if the data is in fast tier
 * false otherwise
 */
query_2t(file, off, len) {
  return (fast.contains(file,off,len));
}
```

FIG. 4

```
// 410: code for Data Nodes 130
// the job tracker 120 calls it when it knows that data is no longer needed
because the job has exited
evict_2t(file, off, len) {
  file.consumed = true;
  file.age = MAX_AGE;
  free_space(file.length);
}

// 420: Code for Job Tracker 120
start_job(job) {
  foreach task in job.tasks {
    foreach file in task.files {
      // use the existing code to find which data node 130 on which to run
      the job datanode = find_job_location();
      // send a message to that data node 130 to call its predict function
on this file with HIGH_CONFIDENCE
    }
  }
}

// 430: Code for Job Tracker 120
end_job(job) {
  foreach file in jobs.files {
    foreach data node 130 on which this job ran tasks {
      // send a message to the data node 130 to call its evict_t2 routine on this file
    }
  }
}
```

CONTENT-AWARE STORAGE TIERING TECHNIQUES WITHIN A JOB SCHEDULING SYSTEM

FIELD

The field relates generally to data storage and more particularly to techniques for storing data in a multi-tier storage system.

BACKGROUND

It is often difficult to balance the conflicting demands of storage capacity requirements and performance requirements (e.g., access times). Multi-tier storage environments, such as two-tier storage systems, typically provide a performance tier that employs memory based on performance considerations and a capacity tier that employs storage based on capacity considerations. In this manner, multi-tier storage systems balance between the relative costs of memory and other storage and their relative speeds. Such multi-tier storage environments typically allow particular levels of performance to be achieved at a significantly lower cost than would otherwise be possible.

It is often desirable to provide such multi-tier storage environments transparently to users and applications. In some circumstances, however, applications can obtain performance improvements when the multiple tiers are visible to applications.

MapReduce is a programming model for processing large data sets, such as distributed computing tasks on clusters of computers. During the map phase, a master node receives an input, divides the input into smaller sub-tasks, and distributes the smaller sub-tasks to worker nodes. During the reduce phase, the master node collects the answers to the sub-tasks and combines the answers to form an output (i.e., the answer to the initial problem).

A need exists for improved techniques for transparently including multi-tier storage systems in such MapReduce environments. A further need exists for content-aware storage tiering techniques in such MapReduce environments that are based on semantic data chunks.

SUMMARY

Embodiments of the present invention provide improved techniques for content-aware storage tiering techniques within a job scheduling system. According to one exemplary embodiment, a data node in a job scheduling environment receives at least one job to be executed for a portion of a larger logical file, and notifies one or more sibling data nodes in the job scheduling environment to prefetch one or more related portions of the larger logical file.

In at least one embodiment, a write operation performed by an application client to store data on the data node is intercepted and the data associated with the intercepted write operation is stored in a performance storage tier of the data node that employs storage resources based on performance considerations. The data is moved from the performance storage tier if one or more predefined eviction criteria are satisfied to a capacity storage tier that employs storage resources based on capacity considerations.

In one or more embodiments, data objects to be evicted from one or more storage devices are selected based on an anticipated future access of the data objects. The selection of the one or more data objects for eviction is based on grey box knowledge of the application client and/or information obtained from the application client.

Advantageously, illustrative embodiments of the invention provide improved storage tiering techniques. These and other features and advantages of the present invention will become more readily apparent from the accompanying drawings and the following detailed description.

DETAILED DESCRIPTION

Illustrative embodiments of the present invention will be described herein with reference to an exemplary MapReduce compute architecture and associated compute nodes, storage systems, applications and other processing devices. It is to be appreciated, however, that the invention is not restricted to use with the particular illustrative MapReduce architecture and device configurations shown. Accordingly, the terms "job scheduler" and "job tracker" as used herein are intended to be broadly construed, so as to encompass, for example, other job scheduling entities in a batch system, a distributed resource management system (DRMS), or a distributed resource manager (DRM), as would be apparent to a person of ordinary skill in the art. Likewise, the term "data node" as used herein is intended to be broadly construed, so as to encompass, for example, other storage nodes in a job scheduling system, a batch system, a distributed resource management system (DRMS), or a distributed resource manager (DRM).

In one exemplary embodiment, a two-tier storage system comprises a first performance tier that employs memory based on performance considerations (e.g., access times) and a second capacity tier that employs storage based on capacity considerations. In this manner, the two-tier storage system balances between the relative costs of memory and other storage and their relative speeds. It is to be appreciated that more than two storage tiers may be used in other embodiments.

The exemplary performance tier comprises a flash memory, such as a DSSD™ flash storage system, commercially available from EMC Corp., or other high-speed memory having a substantially lower access time than the capacity tier. Although flash memory will often be used for the high-speed memory of the burst buffer appliance, other types of low-latency memory could be used instead of flash memory. Typically, such low-latency memories comprise electronic memories, which may be implemented using non-volatile memories, volatile memories or combinations of non-volatile and volatile memories.

The exemplary capacity tier may be implemented, for example, using a Distributed Application Object Storage (DAOS) Object Store, proposed by Intel Corp.; a multi disk storage tier, such as an Isilon™ storage array, commercially available from EMC Corp.; or ViPR™, a software-defined Storage as a Service key-value storage product, commercially available from EMC Corp. (ViPR™ abstracts storage from disparate arrays into a single pool of storage capacity).

While the present invention is illustrated herein using multiple storage tiers comprised of a plurality of exemplary storage technologies, such as flash storage, other storage technologies can be employed in each tier, as would be apparent to a person of ordinary skill in the art. In addition, while the present invention is illustrated herein using multiple storage tiers to store a checkpoint, as noted above, the present invention also applies to the storage of other data, such as other bursty IO tasks, as would be apparent to a person of ordinary skill in the art.

In at least one embodiment, content-aware storage tiering techniques that are based on semantic data chunks are provided for MapReduce environments and other job scheduling systems. For example, a shared file is often split into a plurality of chunks stored on a number of different data nodes. Different jobs will each consume a different chunk of a shared file. The disclosed job scheduling and storage tiering techniques allow jobs to be assigned to data nodes that are local to their respective chunks, and for the chunks to be prefetched, if needed.

Thus, aspects of the invention provide differentiated storage resources. For example, as discussed further below, storage resources may be generally differentiated between "fast" and "slow" storage layers. In addition, storage resources may be further differentiated between bandwidth optimized and IO operation (IOP) optimized storage layers. In another variation, the differentiated storage resources can include one or more of key-value flash-based DSSD™ storage system from EMC Corp., key-value disk-based Kinetic™ Open Storage platform from Seagate Technology LLC and shingled disk drives.

Another aspect of the present invention recognizes that data needed for a given job, such as an IO Intensive job, may be resident in a slow storage tier. Thus, required data for a given IO Intensive job is optionally prefetched from the slow storage tier to a fast storage tier before the given IO Intensive job is assigned to a data node for execution.

A further aspect of the invention performs future-aware victim selection for the multi-tiered storage to reduce the amount data stored in a fast storage tier that will not be needed in the near future. While conventional eviction algorithms typically guess about future data accesses, the disclosed techniques allow the job tracker to parse the job queue to determine future data accesses. In this manner, future-aware data eviction decisions are made to thereby minimize the amount of capacity in the fast storage tier that stores cold data (i.e., data that is not expected to be accessed).

In at least one embodiment described herein, individual jobs can be classified as a CPU Intensive job; an IO Intensive job or a Small IO job. In addition, individual storage resources are optionally classified as a performance class that employs storage resources based on performance considerations, a capacity class that employs storage resources based on capacity considerations, and a key-value storage class that employs a hardware accelerated partitioned key-value store with reduced latency for producers and consumers of small data chunks.

In at least one exemplary embodiment, "small files" are distinguished from "large files" using a size threshold based on, for example, the page size of the file system and/or the client operating system. For example, a file system page size may be 4 Kbytes or 64 Kbytes, and any files smaller than the established page size may be characterized as small files.

Figure 1:
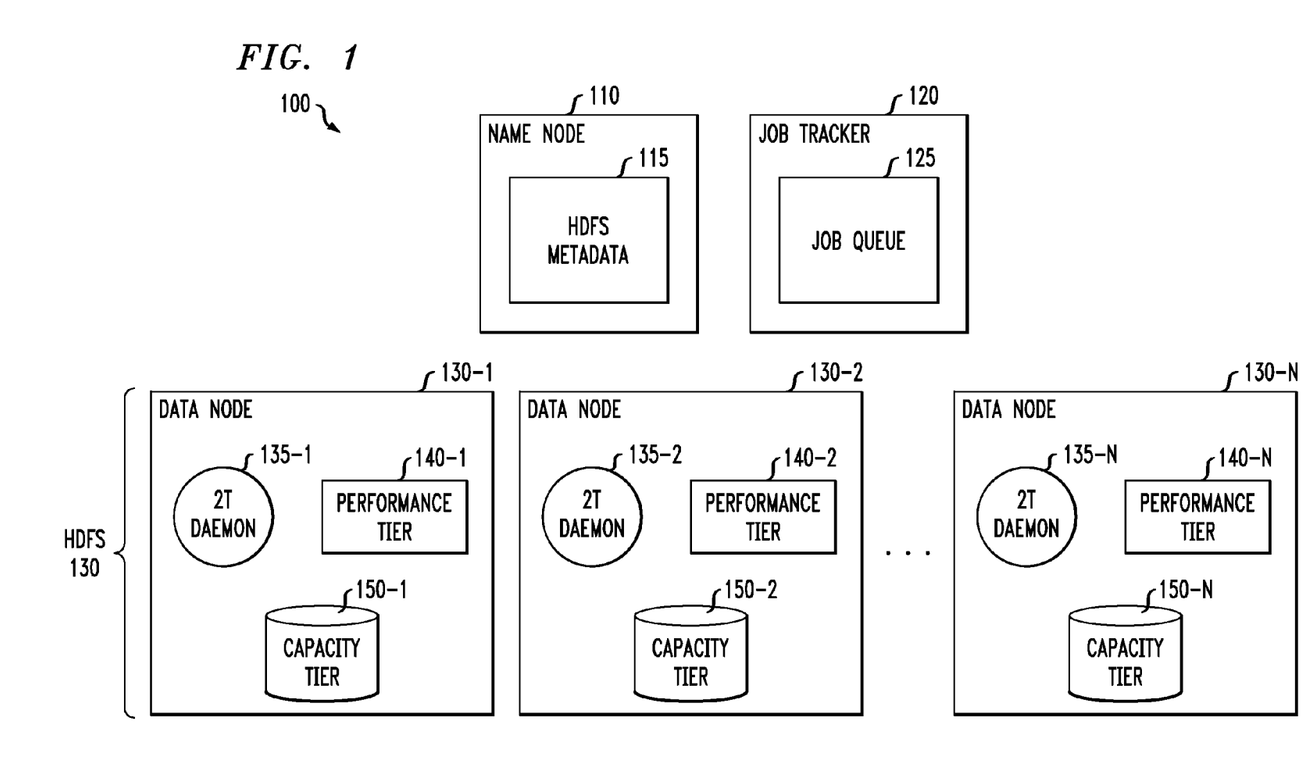
FIG. 1 illustrates an exemplary Hadoop architecture for distributed storage and distributed processing of large data sets.

FIG. 1 illustrates an exemplary Hadoop architecture 100 for distributed storage and distributed processing of large data sets on one or more computer clusters. As shown in FIG. 1, the exemplary Hadoop architecture 100 comprises a name node 110, a job tracker 120 and a Hadoop Distributed File System (HDFS) 130 comprised of a plurality of data nodes 130-1 through 130-N. Generally, an exemplary Hadoop architecture 100 splits input files into blocks, often referred to as FileSplits, and distributes the blocks among the plurality of data nodes 130. For a more detailed discussion of conventional aspects of the exemplary Hadoop architecture 100, see, for example, Ovum IT Information Management, "Enterprise-Grade Hadoop: The Building Blocks," (Sep. 24, 2014).

The exemplary name node 110 maintains the directory tree of all files in the file system, in a known manner, and tracks where file data is kept across the plurality of data nodes 130. Client applications communicate with the name node 110, for example, when they need to locate a file, or when they want to add, copy, move or delete a file, in a known manner. The name node 110 responds to file requests by returning a list of relevant data nodes 130 where the data is located.

In one exemplary embodiment, the name node 110 provides a single namespace for a multi-tiered architecture combining small, fast storage layers (such as flash storage) with larger, slower storage layers (such as disk-based cloud-scale object stores). Among other benefits, the single namespace allows unmodified applications to run anywhere without any required knowledge about data locality.

In addition, the exemplary name node 110 provides one or more interfaces to allow data locality (i.e., where the data is stored in the HDFS 130) to be queried and controlled.

Client applications submit jobs to the job tracker 120. The exemplary job tracker 120 then assigns the jobs to specific data nodes 130. For a more detailed discussion of suitable job scheduling techniques, see, for example, U.S. patent application Ser. No. 14/751,721, entitled "Scheduling Computational Tasks Among Multiple Classes of Storage Resources Based on Job Classification," filed contemporaneously herewith and incorporated by reference herein.

The exemplary job tracker 120 assigns jobs to data nodes 130 from a single job queue 125. In one variation, the job tracker 120 optionally maintains a separate job queue 125 for each predefined job class. As noted above, in at least one exemplary embodiment, individual jobs can be classified as a CPU Intensive job; an IO Intensive job or a Small IO job. Thus, in an alternate embodiment, the exemplary job tracker 120 maintains an IO Intensive job queue, a Small IO job queue and a CPU Intensive job queue for jobs of the corresponding class. Jobs can be assigned from the one or more queues 125, for example, using a first in-first out (FIFO) buffer, or based on a weight assigned to each job.

The optional classification of a given job to a predefined job class may be performed, for example, in accordance with the teachings of A. Sabne et al., "HeteroDoop: A MapReduce Programming System for Accelerator Clusters," Proc. of the 24th Int'l Symposium on High-Performance Parallel and Distributed Computing (HPDC '15), 235-46 (2015), incorporated by reference herein. In this manner, a conventional job tracker 120 is modified to classify a given job to a predefined job class based on specific job characteristics (e.g., whether a given job is CPU intensive or IO intensive).

Generally, the exemplary job tracker 120 communicates with the name node 110 to deteiiiiiine the location of data, in a known manner. In addition, the exemplary job tracker 120 optionally assigns each job to a particular data node 130. When the work is complete, the job tracker 120 optionally updates status information.

As noted above, the exemplary job tracker 120 assigns jobs to a data node 130. In the exemplary embodiment of FIG. 1, the HDFS 130 comprises data nodes 130-1 through 130-N. As shown in FIG. 1, each exemplary data node 130-*i* comprises a first performance storage tier 140-*i* and a second capacity storage tier 150-*i*, discussed further below.

Generally, as noted above, the data nodes 130-*i* store data in the HDFS 130. On startup, a data node 130 typically connects to the name node 110 and then responds to requests from the name node 110 for file system operations. Client applications can talk directly to a data node 130, once the name node 110 has provided the location of the data. Similarly, MapReduce operations farmed out, for example, to task tracker instances near a particular data node 130-*i*, talk directly to the data node 130-*i* to access the files. Task tracker instances can be deployed on the same servers as host data node 130-*i* instances, so that MapReduce operations are performed close to the data. Thus, each data node 130-*i* includes one or more processing units, such as one or more central processing units (CPUs) and/or one or more graphics processing units (GPUs).

As shown in FIG. 1, each exemplary data node 130 also comprises a two-tier (2T) daemon 135-*i* that intercepts read and write operations from application clients. According to one aspect of the invention, the exemplary two-tier daemons 135-*i* store newly written data synchronously into the performance tier 140 so that the clients see low latency, high performance write operations. In addition, the exemplary two-tier daemons 135-*i* optionally asynchronously copy the data from the performance tier 140 to the disk-based storage in the capacity tier 150 to free the data from the flash storage in the performance tier 140 when additional capacity in the performance tier 140 is required.

According to another aspect of the invention, the exemplary two-tier daemons 135-*i* use semantic information about FileSplits (e.g., when a large logical file is split among data nodes) to make informed caching and eviction decisions. For example, when accessing a stripe of a larger file, an exemplary two-tier daemon 135-*i* can identify the request as part of a large file and have siblings access related stripes.

According to another aspect of the invention, after a first FileSplit is read, the job tracker 120 optionally evaluates jobs in the job queue 125 to know which FileSplits will be read for future jobs. The exemplary job tracker 120 can then instruct the two-tier daemons 135-*i* to prefetch the related FileSplits and to wait for the data to be prefetched before running the jobs, as discussed in the following section. In addition, the exemplary job tracker 120 can determine when FileSplits will no longer be read and instruct the two-tier daemons 135-*i* that freeing the data from the performance tier 140 is safe.

In this way, a two-tier aware scheduling system can query and manipulate data locality and then assign jobs for unmodified applications appropriately. Although applications are unaware of the tiered architecture, applications benefit from the tiered architecture by running more quickly since the job tracker 120 has ensured an efficient environment.

A plurality of data nodes 130 can share a flash storage system, such as a flash-based DSSD™ storage system from EMC Corp. According to one aspect of the invention, a given data node 130-*i* can prefetch one or more related portions, such as FileSplits, of a larger logical file on behalf of its sibling data nodes 130. In this manner, uncoordinated sibling prefetch is achieved without requiring the messaging and the data node coordination.

Prefetching

As noted above, one aspect of the invention recognizes that data needed for a given job, such as an exemplary IO Intensive job, may be resident in the capacity storage tier 150 of a given data node 130-*i*. Thus, required data for a given IO Intensive job is optionally prefetched from the capacity storage tier 150 to the performance storage tier 140 before the given IO Intensive job is assigned to the given data node 130-*i*. In one exemplary embodiment, the given IO Intensive job is optionally maintained in the job queue 125 until the prefetch is complete. The given IO Intensive job can be assigned to the data node 130-*i* for execution when the prefetch is complete. In this manner, the given exemplary IO Intensive job is delayed until the needed data is available. In this manner, the job tracker 120 prepares the Hadoop environment 100 before scheduling an IO intensive job or another job that would benefit from prefetching by looking into the job queue 125 and finding jobs that need data that is not currently in the performance storage tier 140. The job tracker 120 then sends directives to the assigned data node 130-*i* to replicate the target data into the performance storage tier 140. In one exemplary embodiment, the job tracker 120 holds the job until the replication is complete.

According to another aspect of the invention, the prefetching can be coordinated among the various data nodes 130 by the two-tier daemons 135-*i*. When a two-tier daemon 135-*i* receives a read request for a FileSplit, f, that is in its capacity tier 150 and not in its performance tier 140, the two-tier daemon 135-*i* can use "grey box" knowledge (e.g., with a basic understanding of how things work) of MapReduce workloads to anticipate that if FileSplit f is being read, the other FileSplits for the same file will also be read. Therefore, the two-tier daemon 135-*i* queries the name node 110 about the locality of other FileSplits for the same file for which f is a FileSplit. The two-tier daemon 135-*i* then sends a network message to the other two-tier daemons 135-*i* which host the other FileSplits to notify them that they can expect that their FileSplits will soon be read. Those two-tier daemons 135-*i* will then prefetch those FileSplits into their performance tiers 140 so that the subsequent anticipated reads will achieve the performance of the fast tier instead of the capacity tier 150.

For example, in the exemplary MapReduce setting, a small IO mapper (also known as a producer) executes and key-value IO is intercepted and rerouted. Then, a small IO reducer (also known as a consumer) executes and the reads are intercepted and rerouted. Although the IO access patterns cannot be fully predicted, it may be known that the workload typically involves such producer-consumer data pipelines. Therefore, an exemplary two-tier daemon 135-*i* will not evict freshly written data from the performance tier 140 since it will anticipate that the reducer will subsequently read the data. Additionally, once the data is read, the exemplary two-tier daemon 135-*i* can again use grey box knowledge about typical MapReduce IO patterns to evict the data since the consumer is done.

As indicated above, one or more data nodes 130 of FIG. 1 comprises a performance storage tier 140 and a capacity storage tier 150. It is to be appreciated, however, that more than two storage tiers may be used in one or more exemplary data nodes 130 in other embodiments. The exemplary performance storage tier 140 and capacity storage tier 150 comprise respective disjoint subsets of storage. The performance storage tier 140 and capacity storage tier 150 in this embodiment comprise different types of storage devices having different performance characteristics. In the present embodiment, the exemplary performance storage tier 140 comprises flash storage devices and the exemplary capacity storage tier 150 comprises one or more disk storage devices.

The flash storage devices of the performance storage tier 140 are generally significantly faster in terms of read and write access times than the disk storage devices of the capacity storage tier 150. The flash storage devices are therefore considered "fast" devices in this embodiment relative to the "slow" disk storage devices. Accordingly, the exemplary Hadoop architecture 100 may be characterized in the present embodiment as having a "fast" storage tier 140 and a "slow" storage tier 150, where "fast" and "slow" in this context are relative terms and not intended to denote any particular absolute performance level. However, numerous alternative tiering arrangements may be used, including three or more tiers each providing a different level of performance The particular storage devices used in a given storage tier may be varied in other embodiments and multiple distinct storage device types may be used within a single storage tier.

The flash storage devices of the performance storage tier 140 generally provide higher performance than the disk storage devices of the capacity storage tier 150 but the disk storage devices of the capacity storage tier 150 generally provide higher capacity at lower cost than the flash storage devices. The exemplary tiering arrangement of the exemplary data nodes 130 in FIG. 1 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the Hadoop architecture 100, leading to enhanced system performance relative to conventional arrangements, while additionally or alternatively providing an ability to achieve particular levels of performance at lower cost.

In a further variation, additional performance improvements can be achieved when applications are modified to employ the multi-tiered storage and job scheduling techniques described herein. While the job tracker 120 has some knowledge about data dependencies, the applications themselves have even more information available regarding data dependencies. Typically, in the exemplary Hadoop environment 100, a chunk of a shared file is typically split into HDFS "FileSplits." For example, a shared file is often split into a plurality of chunks, often referred to as FileSplits, stored on a number of different data nodes. Different jobs will each consume a different chunk of a shared file. Some FileSplits might be read multiple times or only once. This information is typically only available to the applications themselves. Therefore, modified applications inform the job tracker 120, data nodes 130 or two-tier daemons 135-*i* of future accesses so that the victim selection can be more reliable.

Figure 2:
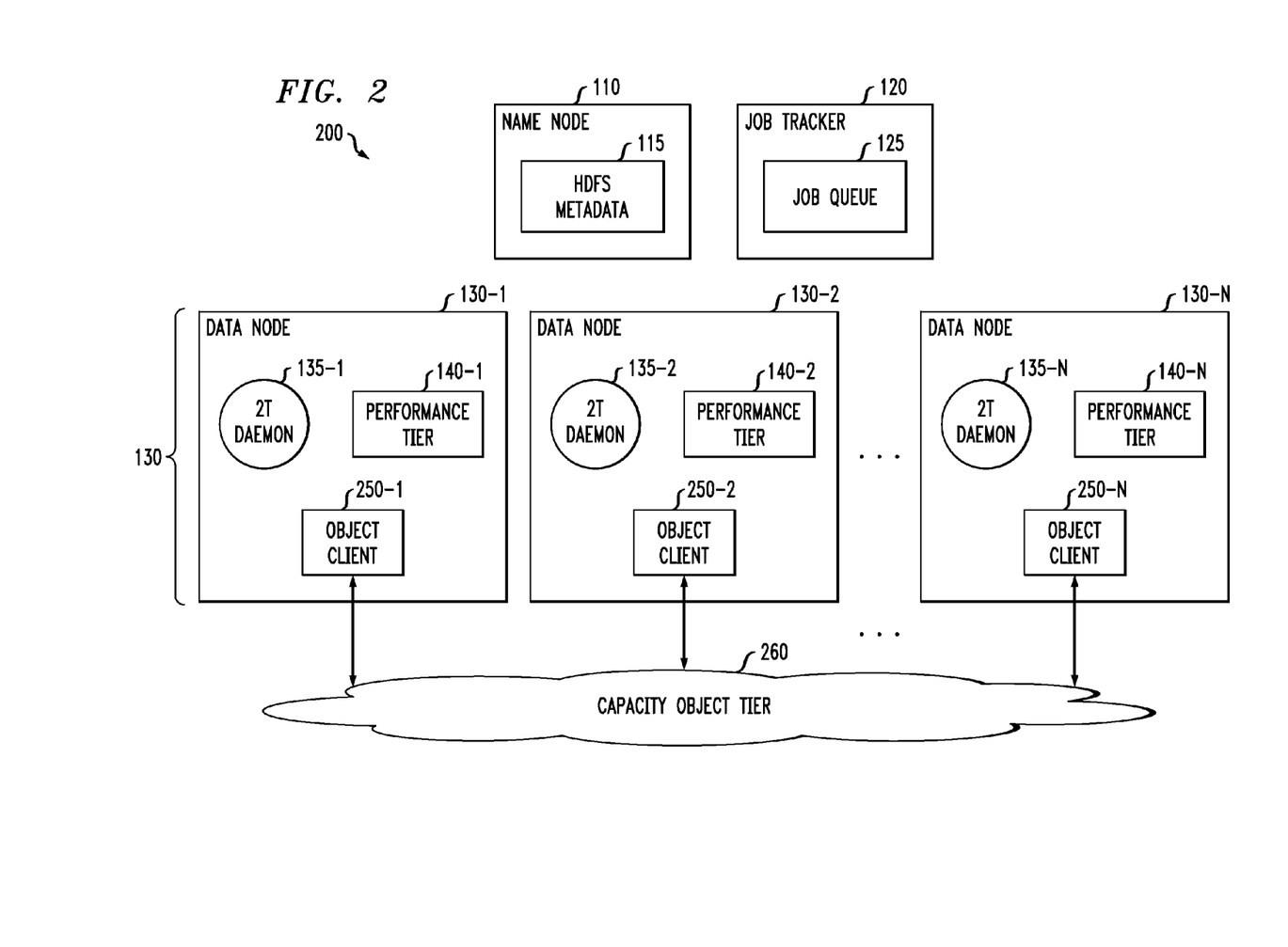
FIG. 2 illustrates an alternate exemplary Hadoop architecture for distributed storage and distributed processing of large data sets.

FIG. 2 illustrates an alternate exemplary Hadoop architecture 200 for distributed storage and distributed processing of large data sets on one or more computer clusters. As shown in FIG. 2, the exemplary Hadoop architecture 200 comprises a name node 110, a job tracker 120 and a Hadoop Distributed File System (HDFS) 130 comprised of a plurality of data nodes 130-1 through 130-N, in a similar manner to the Hadoop architecture 100 of FIG. 1. The exemplary data nodes 130 of FIG. 2 also include a performance tier 140 and a two-tier daemon 135-*i*, in a similar manner to the Hadoop architecture 100 of FIG. 1.

In the exemplary Hadoop architecture 200 of FIG. 2, however, the capacity tier 150 in the data nodes 130 of FIG. 1 are replaced by object clients 250-*i* connected to a capacity object tier 260. Erasure coding is optionally employed on the capacity object tier 260 to provide data resilience to storage failures (rather than typical three-way replication).

As noted above, the exemplary capacity tier may be implemented, for example, using a Distributed Application Object Storage (DAOS) Object Store, proposed by Intel Corp.; a multi disk storage tier, such as an Isilon™ storage array, commercially available from EMC Corp.; or ViPR™, a software-defined Storage as a Service key-value storage product, commercially available from EMC Corp. (ViPR™ abstracts storage from disparate arrays into a single pool of storage capacity).

Pseudo Code

Figure 3A:
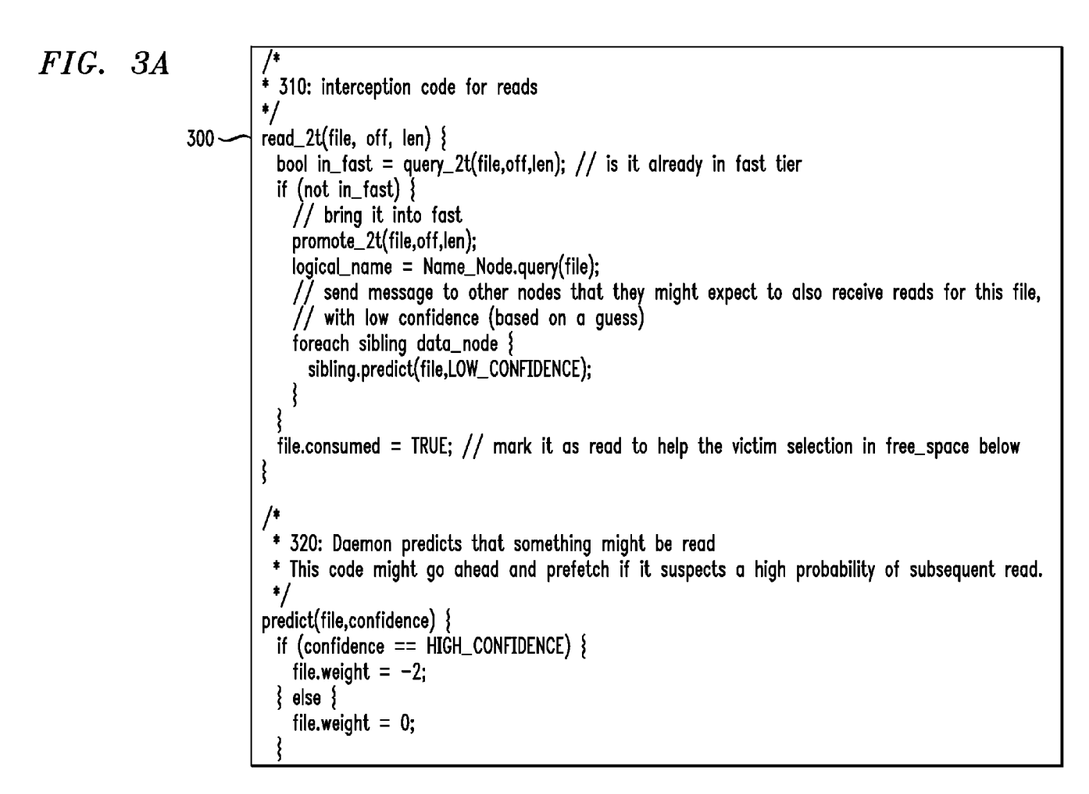
FIGS. 3A through 3C, collectively, illustrate exemplary pseudo code incorporating storage tiering aspects of the invention for the data nodes of FIG. 1.
Figure 3B:
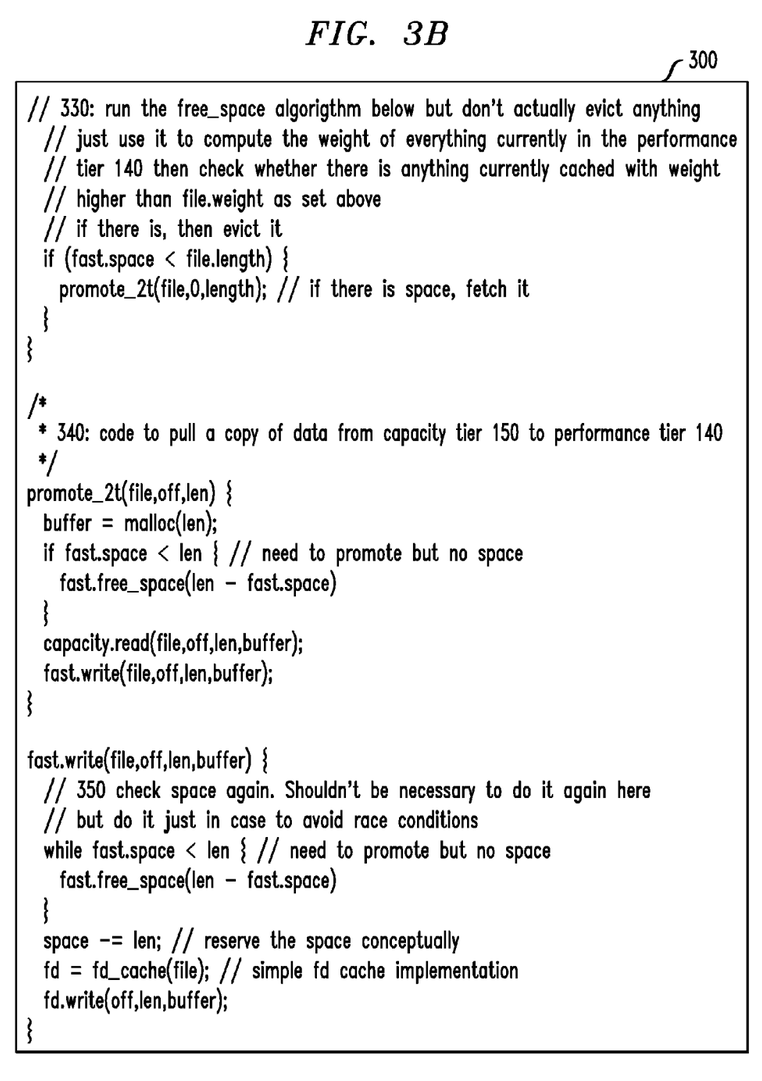
Figure 3C:
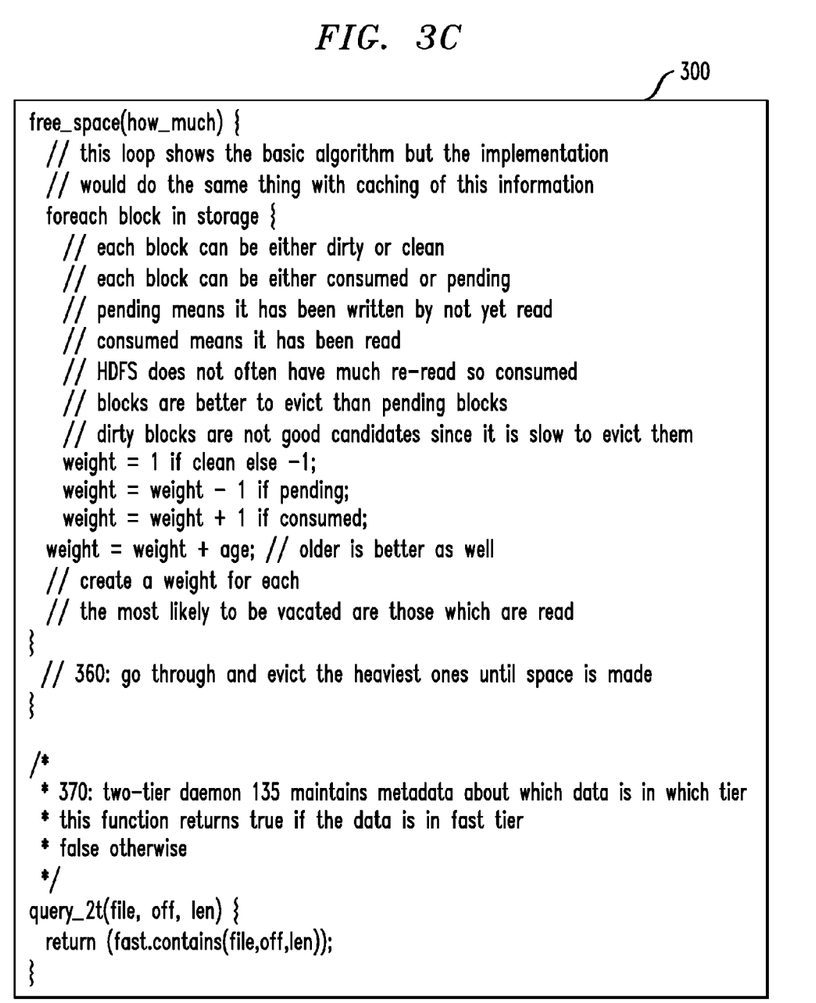

FIGS. 3A through 3C, collectively, illustrate exemplary pseudo code 300 for the data nodes 130 of FIG. 1 incorporating aspects of the invention. As shown in FIG. 3A, the exemplary pseudo code 300 comprises a code section 310 that is performed by one or more data nodes 130 to intercept read operations. As noted above, the exemplary two-tier daemons 135-*i* intercept read operations from application clients and store newly written data synchronously into the performance tier 140 so that the clients see low latency, high performance write operations. In addition, the exemplary two-tier daemons 135-*i* optionally asynchronously copy the data from the performance tier 140 to the disk-based storage in the capacity tier 150 to free the data from the flash storage in the performance tier 140 when additional capacity in the performance tier 140 is required.

In addition, the code section 310 includes instructions for the initial two-tier daemon 135-*i* to send notifications to other two-tier daemons 135-*i* indicating that they should expect reads for related FileSplits.

In addition, the exemplary pseudo code 300 (FIG. 3A) comprises a code section 320 that is performed when a two-tier daemons 135-*i* predicts that a data object might be read.

As shown in FIG. 3B, the exemplary pseudo code 300 comprises a code section 330 that is performed to compute the weight of all data objects currently in the performance tier 140 and to evaluate whether there is anything currently cached with a higher weight. In addition, a code section 340 is performed to move a copy of data from the capacity tier 150 to the performance tier 140. Another code section 350 reevaluates the space in the performance tier 140 to avoid race conditions.

After weights are assigned to each data object in code section 350, code section 360 processes the weights and evicts the objects having heaviest weights until sufficient space is cleared. In code section 370 (FIG. 3C), the two-tier daemon 135 maintains metadata about which data is in which tier.

Figure 4:
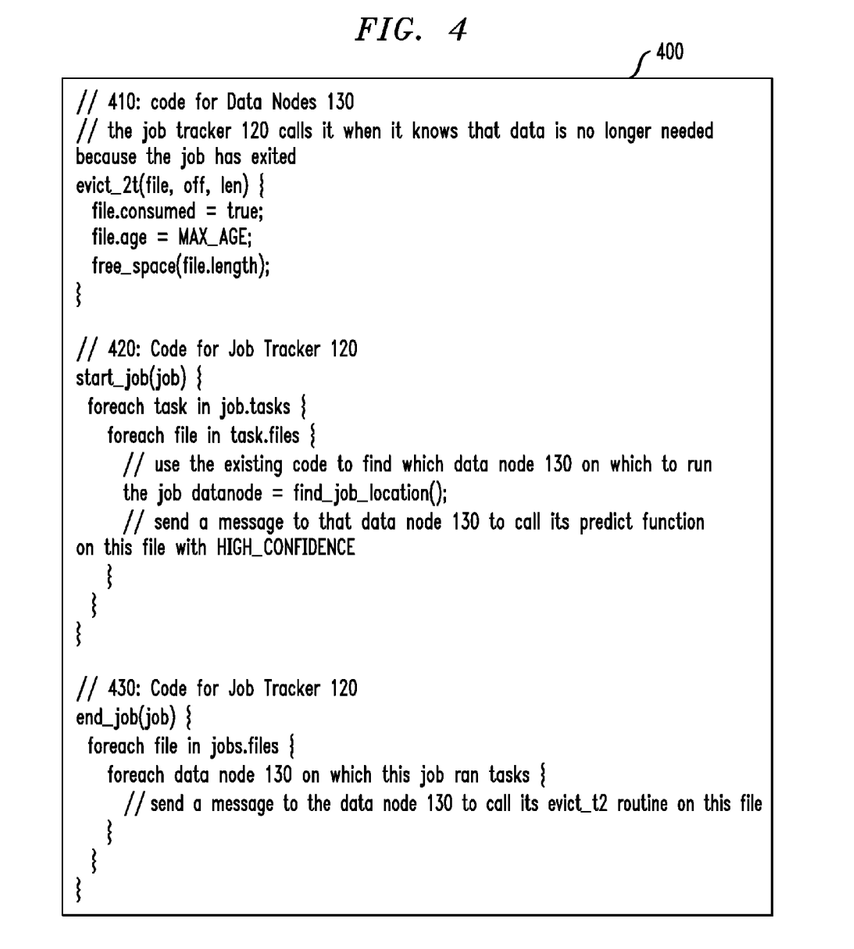
FIG. 4 illustrates exemplary pseudo code for the job tracker and data nodes of FIG. 1.

FIG. 4 illustrates exemplary pseudo code 400 for the job tracker 120 and data nodes 130 of FIG. 1. As shown in FIG. 4, the exemplary pseudo code 400 comprises a code section 410 that is performed by one or more data nodes 130 to evict data. Code section 410 is triggered when the job tracker 120 knows that data is no longer needed because the job has exited.

In addition, the exemplary pseudo code 400 comprises a code section 420 that is performed by the job tracker 120 to select a data node 130 to run a particular job. In addition, the job tracker 120 notifies the selected data node 130 to call a predict function to obtain the data with high confidence.

The exemplary pseudo code 400 also comprises a code section 430 that is performed by the job tracker 120 to trigger the eviction of data that is no longer needed because the job has exited.

Conclusion

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

As noted above, aspects of the invention are described in the context of an exemplary MapReduce compute architecture, the invention is not restricted to use with the particular illustrative MapReduce architecture and device configurations shown. The invention is applicable to other job scheduling systems, such as the Condor distributed job scheduler, the Slurm job scheduler or the Portable Batch System (PBS) job scheduler, as would be apparent to a person of ordinary skill in the art.

It is to be appreciated that the particular operations and associated messaging illustrated in FIGS. 3A-3C and 4 are exemplary only, and numerous other types of operations and messaging may be used in other embodiments. It should therefore be understood that in other embodiments different arrangements of additional or alternative elements may be used. At least a subset of these elements may be collectively implemented on a common processing platform, or each such element may be implemented on a separate processing platform.

It is noted that components of the name node 110, the job tracker 120 or a data node 130 as disclosed herein can be implemented at least in part in the form of one or more software programs stored in memory and executed by a processor of a processing device. A memory having such program code embodied therein is an example of what is more generally referred to herein as a "computer program product."

Figure 5:
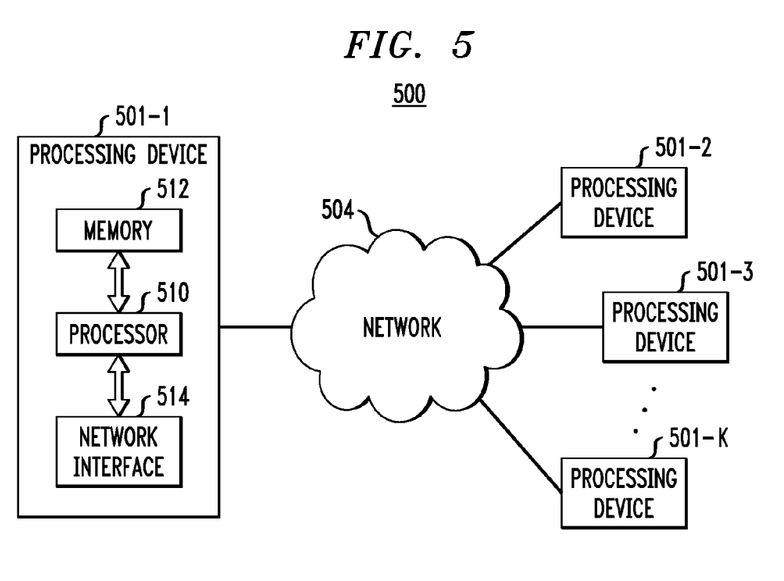
FIG. 5 illustrates an exemplary processing platform in which aspects of the present invention can be employed.

FIG. 5 illustrates an exemplary processing platform in which aspects of the present invention can be employed. The exemplary processing platform 500 comprises a plurality of processing devices, denoted 501-1, 501-2, 501-3, . . . 501-K, that communicate with one another over a network 504. The network 504 may comprise any type of network, such as a WAN, a LAN, a satellite network, a telephone or cable network, or various portions or combinations of these and other types of networks.

The processing device 501-1 in the processing platform 500 comprises a processor 510 coupled to a memory 512. The processor 510 may comprise a microprocessor, a microcontroller, an application-specific integrated circuit (ASIC), a field-programmable gate array (FPGA) or other type of processing circuitry, as well as portions or combinations of such circuitry elements, and the memory 512, which may be viewed as an example of a "computer program product" having executable computer program code embodied therein, may comprise random access memory (RAM), read-only memory (ROM) or other types of memory, in any combination.

Also included in the processing device 501-1 is network interface circuitry 514, which is used to interface the processing device with the network 504 and other system components, and may comprise conventional transceivers.

The other processing devices 501 of the processing platform 500 are assumed to be configured in a manner similar to that shown for processing device 501-1 in the figure.

Again, the particular processing platform 500 shown in FIG. 5 is presented by way of example only, and Hadoop architecture 100 may include additional or alternative processing platforms, as well as numerous distinct processing platforms in any combination, with each such platform comprising one or more computers, servers, storage devices or other processing devices.

It should again be emphasized that the above-described embodiments of the invention are presented for purposes of illustration only. Many variations and other alternative embodiments may be used. For example, the techniques are applicable to a wide variety of other types of devices and systems that can benefit from the job scheduling techniques disclosed herein. Also, the particular configuration of system and device elements shown in FIGS. 1, 2 and 5 can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method performed in a data node of a job scheduling environment, comprising:
   receiving, by said data node, a read request for at least one job to be executed for a portion of a larger logical file; and
   notifying, by said data node in response to said read request for said portion of said larger logical file, at least a second sibling data node in the job scheduling environment to prefetch one or more related portions of the larger logical file needed for one or more tasks to be executed by said at least second sibling data node, wherein said prefetch occurs before said one or more tasks are assigned to said at least second sibling data node, wherein said larger logical file is stored on one or more tiers of a multi-tier storage system using a single namespace across said multi-tier storage system for said data node and said one or more sibling data nodes.

2. The method of claim 1 further comprising the steps of intercepting at least one write operation perfoiined by an application client to store data on the data node and storing the data associated with the intercepted at least one write operation in a performance storage tier of the data node that employs storage resources based on performance considerations.

3. The method of claim 2 further comprising the step of moving the data from the performance storage tier if one or more predefined eviction criteria are satisfied to a capacity storage tier that employs storage resources based on capacity considerations.

4. The method of claim 3 wherein the one or more predefined eviction criteria comprises an additional capacity needed in the performance storage tier.

5. The method of claim 1 further comprising the step of evicting at least one of the portions of the larger logical file based on an anticipated future access of the at least one portion.

6. The method of claim 5 wherein the anticipated future access is based on one or more of grey box knowledge of the application client and information obtained from the application client.

7. The method of claim 1 further comprising the step of selecting one or more data objects to be evicted from one or more storage devices based on an anticipated future access of the one or more data objects.

8. The method of claim 7 wherein the selection of the one or more data objects for eviction is based on one or more of grey box knowledge of the application client and information obtained from the application client.

9. The method of claim 1 wherein a plurality of the data nodes share a flash storage system and wherein one of the data nodes prefetches the one or more related portions of the larger logical file on behalf of the one or more sibling data nodes.

10. A computer program product comprising a non-transitory processor-readable storage medium having encoded therein executable code of one or more software programs, wherein the one or more software programs when executed perform the steps of the method of claim 1.

11. A data node apparatus of a job scheduling environment, comprising:
a memory; and
at least one hardware device, coupled to the memory, operative to implement the following steps:
receiving, by said data node apparatus, a read request for at least one job to be executed for a portion of a larger logical file; and
notifying, by said data node apparatus in response to said read request for said portion of said larger logical file, at least a second sibling data node in the job scheduling environment to prefetch one or more related portions of the larger logical file needed for one or more tasks to be executed by said at least second sibling data node, wherein said prefetch occurs before said one or more tasks are assigned to said at least second sibling data node, wherein said larger logical file is stored on one or more tiers of a multi-tier storage system using a single namespace across said multi-tier storage system for said data node and said one or more sibling data nodes.

12. The data node apparatus of claim 11 wherein the at least one hardware device is further configured to intercept at least one write operation performed by an application client to store data on the data node, store the data associated with the intercepted at least one write operation in a performance storage tier of the data node that employs storage resources based on performance considerations and move the data from the perfoiiiiance storage tier if one or more predefined eviction criteria are satisfied to a capacity storage tier that employs storage resources based on capacity considerations.

13. The data node apparatus of claim 11 wherein the at least one hardware device is further configured to select one or more data objects to be evicted from one or more storage devices based on an anticipated future access of the one or more data objects.

14. The data node apparatus of claim 13 wherein the selection of the one or more data objects for eviction is based on one or more of grey box knowledge of the application client and information obtained from the application client.

15. The data node apparatus of claim 11 wherein the capacity storage tier comprises a shared capacity object tier.

16. The data node apparatus of claim 11 wherein a plurality of the data nodes share a flash storage system and wherein one of the data nodes prefetches the one or more related portions of the larger logical file on behalf of the one or more sibling data nodes.

17. A job scheduling system comprising:
a job scheduling node; and
a plurality of data nodes, wherein at least one of the data nodes is configured to:
receive, by a first data node, a read request for at least one job to be executed for a portion of a larger logical file; and
notify, by said first data node in response to said read request for said portion of said larger logical file, at least a second sibling data node in the job scheduling environment to prefetch one or more related portions of the larger logical file needed for one or more tasks to be executed by said at least second sibling data node, wherein said prefetch occurs before said one or more tasks are assigned to said at least second sibling data node, wherein said larger logical file is stored on one or more tiers of a multi-tier storage system using a single namespace across said multi-tier storage system for said data node and said one or more sibling data nodes.

18. The job scheduling system of claim 17 wherein the at least one hardware device is further configured to intercept at least one write operation performed by an application client to store data on the data node, store the data associated with the intercepted at least one write operation in a performance storage tier of the data node that employs storage resources based on performance considerations and move the data from the performance storage tier if one or more predefined eviction criteria are satisfied to a capacity storage tier that employs storage resources based on capacity considerations.

19. The job scheduling system of claim 17 wherein the at least one hardware device is further configured to select one or more data objects to be evicted from one or more storage devices based on an anticipated future access of the one or more data objects.

20. The job scheduling system of claim 19 wherein the selection of the one or more data objects for eviction is based on one or more of grey box knowledge of the application client and information obtained from the application client.

21. The method of claim 1, wherein a daemon executing on said data node queries an interface of a name node to determine a locality of said one or more related portions of the larger logical file and sends a network message to the one or more sibling data nodes that host the one or more related portions to notify the one or more sibling data nodes to prefetch said one or more related portions into respective performance tiers.

* * * * *

UNITED STATES PATENT AND TRADEMARK OFFICE
CERTIFICATE OF CORRECTION

PATENT NO. : 9,934,147 B1  
APPLICATION NO. : 14/751740  
DATED : April 3, 2018  
INVENTOR(S) : John M. Bent et al.

Page 1 of 1

It is certified that error appears in the above-identified patent and that said Letters Patent is hereby corrected as shown below:

In the Claims

Claim 2, Column 10, Line 46, please delete "perfoiined" and replace it with --performed--

Claim 12, Column 11, Line 47, please delete "perfoiiiiance" and replace it with --performance--

Signed and Sealed this
Thirtieth Day of October, 2018

Andrei Iancu
*Director of the United States Patent and Trademark Office*